(12) United States Patent
Zimmerman et al.

(10) Patent No.: US 7,536,683 B2
(45) Date of Patent: May 19, 2009

(54) METHOD OF DYNAMICALLY APPENDING A LIBRARY TO AN ACTIVELY RUNNING PROGRAM

(75) Inventors: Daniel R. Zimmerman, Poulsbo, WA (US); Andrei Yusov, Seattle, WA (US); Muru Palaniappan, Issaquah, WA (US)

(73) Assignee: Adobe Systems Incorporated, San Jose, CA (US)

( * ) Notice: Subject to any disclaimer, the term of this patent is extended or adjusted under 35 U.S.C. 154(b) by 890 days.

(21) Appl. No.: 10/831,970

(22) Filed: Apr. 26, 2004

(65) Prior Publication Data

US 2004/0226031 A1    Nov. 11, 2004

(51) Int. Cl.
G06F 9/45    (2006.01)
(52) U.S. Cl. ....................................................... 717/162
(58) Field of Classification Search .................. 717/162
See application file for complete search history.

(56) References Cited

U.S. PATENT DOCUMENTS

| | | | |
|---|---|---|---|
| 5,375,241 A | 12/1994 | Walsh | |
| 5,410,698 A | 4/1995 | Danneels et al. | |
| 5,421,016 A | 5/1995 | Conner et al. | |
| 5,619,698 A | 4/1997 | Lillich et al. | |
| 5,630,066 A | 5/1997 | Gosling | |
| 5,774,728 A | 6/1998 | Breslau et al. | |
| 5,835,749 A | 11/1998 | Cobb | |
| 5,916,308 A | 6/1999 | Duncan et al. | |
| 5,987,463 A | 11/1999 | Draaijer et al. | |
| 6,003,095 A | 12/1999 | Pekowski et al. | |
| 6,154,878 A * | 11/2000 | Saboff | 717/173 |
| 6,185,733 B1 | 2/2001 | Breslau et al. | |
| 6,202,199 B1 * | 3/2001 | Wygodny et al. | 717/125 |
| 6,202,207 B1 | 3/2001 | Donohue | |
| 6,279,151 B1 | 8/2001 | Breslau et al. | |
| 6,282,703 B1 * | 8/2001 | Meth et al. | 717/163 |
| 6,347,398 B1 | 2/2002 | Parthasarathy et al. | |
| 6,405,246 B1 | 6/2002 | Hutchison | |

OTHER PUBLICATIONS

Fryer, et al. "Microsoft Computer Dictionary", Microsoft Press, 3rd Ed., p. 166, 1997.

* cited by examiner

*Primary Examiner*—John Chavis
(74) *Attorney, Agent, or Firm*—Fish & Richardson P.C.

(57) ABSTRACT

A method for dynamically linking a dynamic library to an application program is provided. The method determines if the dynamic library resides on a computer system on which the application program is executing and locates the dynamic library at a predetermined location if it is determined that the dynamic library does not reside on the computer system. The method further provides for loading and attaching to the dynamic library, receiving a function call by the application to the dynamic library and passing the function call to the dynamic library.

32 Claims, 8 Drawing Sheets

```
class AWE                                                           ← 80
{
  private:
    AWE_app_params m_app_params;              ⎫
    AWE_browser_params m_browser_params;      ⎬ 82
    AWE_call_backs m_app_call_backs;          ⎪
    AWE_error_code m_err_code;                ⎭ class AWE_1 * m_impl;                                    } 84 public:
    AWE(const AWE_app_params *a, const AWE_call_backs *c = (AWE_call_backs *)0, ⎫ 86
        const AWE_browser _params *i = (AWE_browser_params *)0 );               ⎭

~AWE();                                                  } 87

/* Stage 1 calls */                                                ⎫
    static AWE_error_code IsAWEEnabled();                              ⎪
    static AWE_API_ver GetMaxSupportedApiVer();                        ⎪
    AWE_error_code GetBrowserInfo(AWE_browser_params*) const;          ⎬ 88
    AWE_error_code GoToAdobe(unsigned long hwnd, AWE_jump_location loc = ⎪
    AWE_loc_unknown);                                                  ⎪
    AWE_error_code GoToURL(unsigned long hwnd, const char *urlLocation); ⎪
    void DoPeriodicUpdate();                                           ⎭
    AWE_error_code LoadComponent();                          } 89
}
```

FIG. 4

```
                                                            /-90
/* the abstract class */
class AWE_1
{
  public:
    virtual void Init(const AWE_app_params *a, const AWE_call_backs *c,
        const AWE_browser_params *i) = 0;
    virtual  AWE_error_code GetBrowserInfo(AWE_browser_params*) const = 0;
    virtual  AWE_error_code GoToAdobe(unsigned long hwnd,
        AWE_jump_location loc = AWE_loc_unknown) = 0;
    virtual AWE_error_code GoToURL(unsigned long hwnd, const char
*urlLocation) = 0;
    virtual void DoPeriodicUpdate(void) = 0;
    virtual AWE_error_code LoadComponent() = 0;
};

typedef AWE_1 * AWE_1_ptr;

/* the implementation of that class */
class AWE_1_impl : public AWE_1                                    }92
{
  protected:
    AWE_app_params m_app_params;
    AWE_browser_params m_browser_params;
    AWEBrowser   m_browser_path;
    AWE_call_backs m_app_call_backs;

public
    AWE_1_impl();
    ~AWE_1_impl();

virtual void Init(const AWE_app_params *a, const AWE_call_backs *c,
        const AWE_browser_params *i);
    virtual AWE_error_code GetBrowserInfo(AWE_browser_params*) const;
    virtual AWE_error_code GoToAdobe(unsigned long hwnd, AWE_jump_location
loc = AWE_loc_unknown);
    virtual AWE_error_code GoToURL(unsigned long hwnd, const char *urlLocation);
    virtual void DoPeriodicUpdate();
    virtual AWE_error_code LoadComponent();
};
```

FIG. 5

```
/* Stage 2 calls */
AWE_error_code Welcome();

void InitAdobeOnlineManager(unsigned long hwnd = (unsigned long)0,
      unsigned long messageID = (unsigned long)0);
void ShutdownAdobeOnlineManager(void);
AWE_error_code DoAWEPrefs(unsigned long hwnd = (unsigned long)0);
void DoNotification(unsigned long hwnd = (unsigned long)0);
AWE_error_code DoOnlineRegistration( short giveChoices = 0,
      unsigned long parentWND = (unsigned long)0);

AWE_error_code DisplayTopIssues(unsigned long parentWND = (unsigned
long)0);
   unsigned char MoreInfoExists(long contextID, long topicID);
   void DisplayMoreInfo(long contextID, long topicID,
         unsigned long parentWND = (unsigned long)0);
   unsigned char NewDownloadablesExist(void);
   AWE_error_code DisplayDownloadables(unsigned long parentWND = (unsigned
long)0);
      AWE_error_code DownloadSelectedFiles(AWE_Download_files *dlFiles);
      AWE_error_code GetAFile(char *urlString, char *path);
      short PopulateBookMarkMenu(AWEMenuRef menuID,
         AWE_BookMarks whichMenu = AWE_AdobeBookmarks);
      AWE_error_code GotoBookMark(short BookMarkLocation,
         AWE_BookMarks whichMenu = AWE_AdobeBookmarks,
         unsigned long hwnd = (unsigned long)0);
      AWE_error_code DisplayCorpNews(unsigned long parentWND = (unsigned long)0);
```

<?XML VERSION="1.0"?>

<!DOCTYPE AWE SYSTEM "awe.dtd">                                                  ⎫
                                                                                 ⎬ 134
<AWE>                                                                            ⎭

<!-- Adobe Defaults -->
     <image HREF="http://beta1.adobe.com/special/webenabled/AdobeBannerenu.gif"/>
     <jump_list HREF="http://beta1.adobe.com/special/webenabled/AdobeBanner.awe"/>
     <image HREF="http://beta1.adobe.com/special/webenabled/Adobe Web00enu.gif"/>
     <jump_list HREF="http://beta1.adobe.com/special/webenabled/AdobeWeb00.awe"/>
<!-- Product defaults -->
     <product name = "PhotoshopLE">                                              ⎫
          <image                                                                 ⎬ 136
HREF="http://beta1.adobe.com/special/webenabled/AdobeWeb36enu.gif"/>
          <jump_list
HREF="http://beta1.adobe.com/special/webenabled/AdobeWeb36.awe"/>                ⎫
     </product>                                                                  ⎬ 132
                                                                                 ⎭

<platform name="win32" processor="x86" OS="WinNT" OSVersion="4,0,0,0">           ⎬ 138

<code HREF="http://beta1.adobe.com/special/webenabled/Stage2/AdobeWeb"         ⎬ 132 version="2.0.0.8"/>
  <code HREF="http://beta1.adobe.com/special/webenabled/Stage2/Aodb" version="2.0.0.8"/> ⎫
  <code HREF="http://beta1.adobe.com/special/webenabled/Stage2/AOM" version="2.0.0.8"/>  ⎬ 140

<platform>

</AWE>
```

FIG. 8

METHOD OF DYNAMICALLY APPENDING A LIBRARY TO AN ACTIVELY RUNNING PROGRAM

BACKGROUND OF THE INVENTION

The present invention relates to dynamic linking of user applications with function sets or classes used by the user applications.

Libraries are groups of routines that perform functions that may be useful to a different program. It is common for software developers to design application programs to call library routines to perform functions. Libraries may be static or dynamic. Static (or statically linked) libraries are linked once to each application program that uses them during the development of the program, before the program is ever executed. Dynamic libraries, or dynamically linked libraries (DLL), on the other hand, are linked automatically to the calling application programs when such programs are executed (i.e., at "run time"). Dynamic libraries are commonly used because they allow an application program image to be much smaller (as it does not need to include the library functions) and are capable of being shared by multiple application programs. Therefore, different application programs may use a particular dynamic library at the same time, requiring only a single copy of the dynamic library in memory instead of requiring a copy for every program. Additionally, dynamic libraries allow easy substition of one version for another. For example, an old version of a dynamic library may be easily replaced with a new version by simply replacing the file containing the old version with a file containing the new version.

Typically, application program developers distribute new versions of a dynamic library on disks or CDs, or electronically over the Internet. Since many application programs cannot locate the latest application program upgrade on their own, user interaction is often required. For example, the user may search for updates, call the software developer to order new updates or use third party tools to locate updates. There are instances when a dynamic library file or other component library cannot be located on a user's system. As is the case with the upgrade operation, in a repair operation a user locates the library and performs the installation manually. Unlike the upgrade operation, however, the repair operation is not only time consuming but error prone, as the user might install an incorrect file or incompatible version of the file, or even install the file in the wrong location.

Similarly, automatically self-healing/upgrading application programs cannot prevent the installation of an incorrect or incompatible file. Even more problematic still, when a replacement for a missing library file cannot be located, the self-healing/upgrading application program may cease to function properly or quit operation altogether.

SUMMARY

In one aspect of the invention, a method for dynamically linking a dynamic library to an application program includes determining if the dynamic library resides on a computer system on which the application program is executing and locating the dynamic library at a predetermined location if it is determined that the dynamic library does not reside on the computer system. The method further includes loading and attaching to the dynamic library, receiving a function call by the application to the dynamic library and passing the function call to the dynamic library.

In another aspect of the invention, a method of dynamically linking a dynamic library to an application includes using a static library to interface the dynamic library to the application.

The static library allows a dynamic library to be located and loaded transparently on behalf of the application program. Additionally, the static library can determine whether or not a dynamic library that supports the application program is available on the application user's computer system. If such a supporting dynamic library cannot be found on the user's computer system, the static library searches for and retrieves from an external resource, such as a Web site or a CD-ROM, the supporting dynamic library. Because the application interfaces only with a static library which recognizes the same function calls as implemented in the located dynamic library, the application program is complete even when a required dynamic library is unavailable (i.e., not found by the static library). Consequently, although the application program will not have access to the specific features implemented by the unavailable dynamic library, it will still function properly.

BRIEF DESCRIPTION OF THE DRAWINGS

The above objects, features and advantages of the present invention will become more apparent from the following detailed description taken in conjunction with the accompanying drawings, in which:

FIG. 4 is an exemplary definition of an application interface of the static library of FIG. 2.

FIG. 5 is an exemplary definition of a corresponding abstract and implementation interface of the dynamic library.

FIG. 6 is an extension of the exemplary application interface definition providing support for additional API calls.

FIG. 8 is a portion of an exemplary XML file used by the dynamic library during the self-updating process of FIG. 8.

DESCRIPTION

Figure 1:
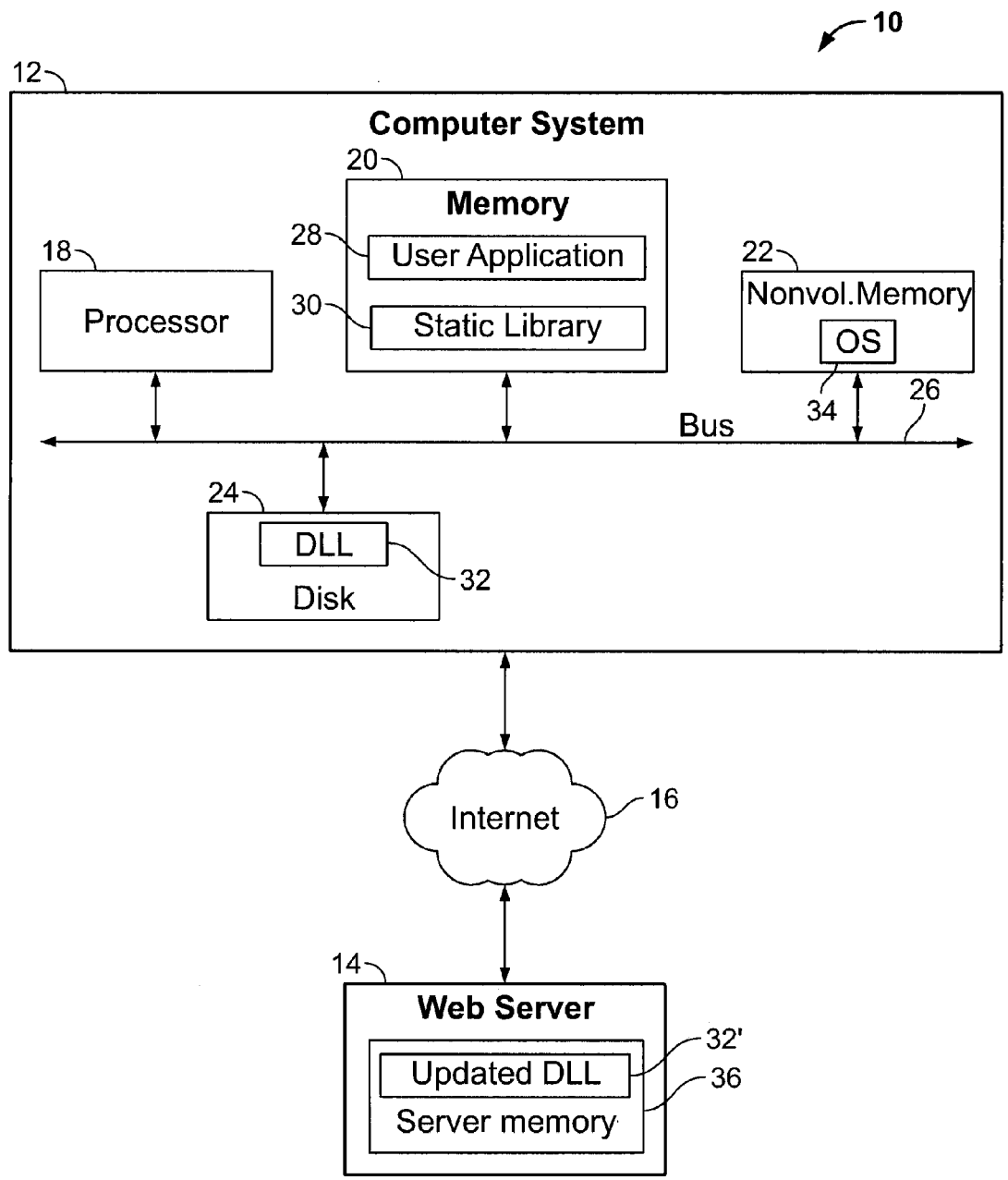
FIG. 1 is a block diagram of a networked system having a static library for interfacing a dynamic library to a user application program.

Referring to FIG. 1, a networked system 10 includes a client computer system (or computer system) 12 coupled to a Web server 14 via the Internet 16. The computer system 12 includes as hardware components a processor 18, a memory 20, a nonvolatile memory 22 and a hard disk 24, coupled together by a bus 26. Although not shown, it is understood that the computer system may include other conventional hardware components, such as a display and I/O device. Residing in the memory 20 are at least one user application program (or application) 28, a statically linked (or static) library 30 and other executing programs (not shown). The static library 30 is connected to the user application program 28 at link time and serves to connect a dynamically linked library ("DLL") or dynamic library 32, typically stored on the hard disk 24, to the application 28 at execution (or run) time. The DLL 32 implements a function set used by the application 28 at run time. The operation of the computer system 12 relies upon the availability of an operating system 34 residing in the nonvolatile memory 22 and executed by the processor 18. The operating system performs low-level initialization of the computer system hardware components, handles the loading of the executable code of the application and the linked static library from the hard disk 24 into memory for access by the processor and controls the run time execution of the computer system. The operating system and the computer system hardware are standard processing components known in the computer art.

In the embodiment shown, the Web server 14 stores in a server memory 36 a latest (up-to-date) version of the DLL 32, shown as an updated DLL 32', provided by the manufacturer or distributor of the application program 28. The static library 30 can download the updated DLL 32' from the Web server 14 via the Internet 16, as will be described.

Although the updated DLL 32' is shown here to be electronically retrievable by the static library from a predetermined location corresponding to a given Web site (or by the DLL 32 itself from one or more Web sites, as later described), it will be appreciated by those skilled in the art that such a DLL could also be made available through other electronic distribution vehicles, such as diskette or CD ROM.

Figure 2:
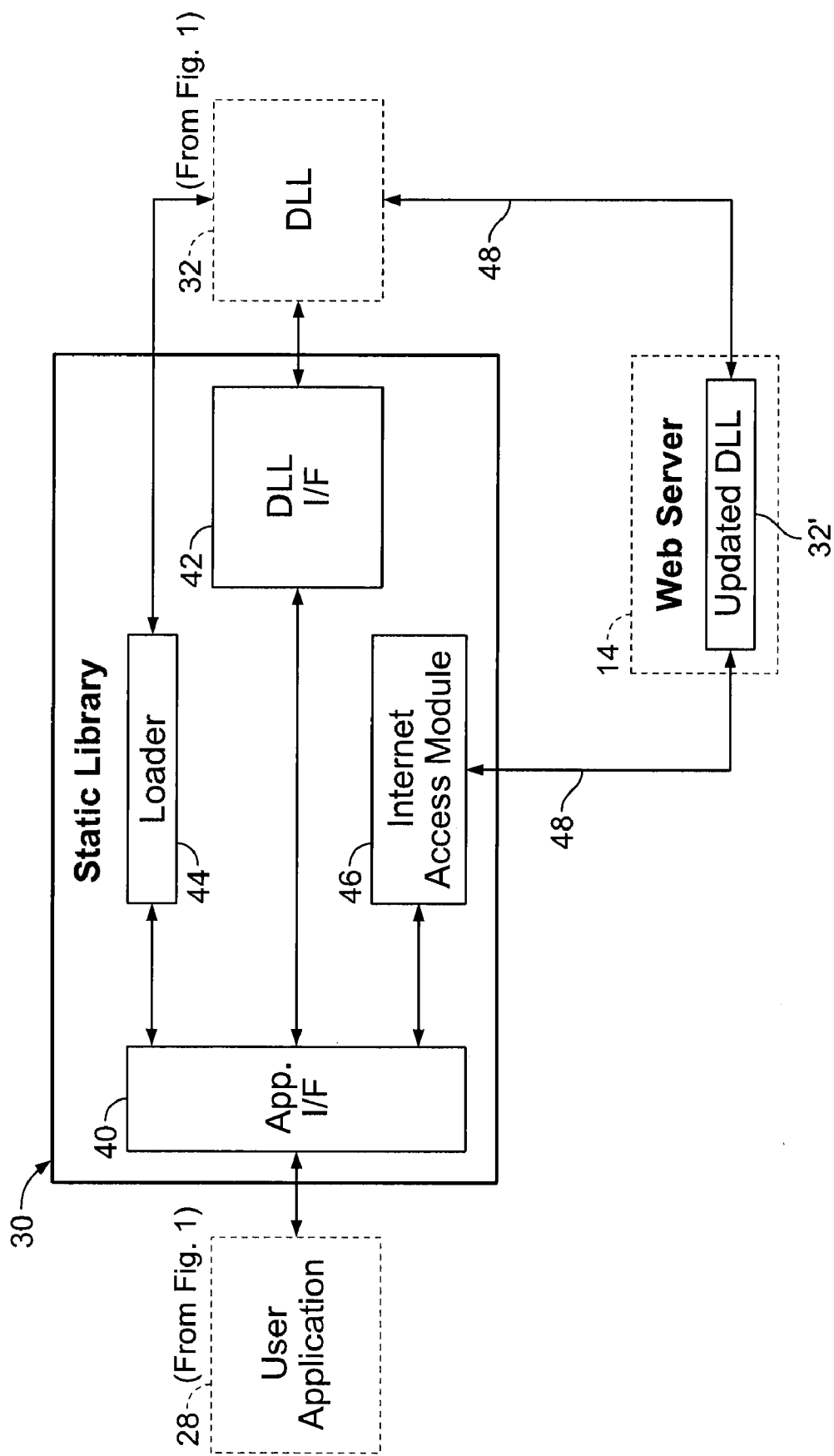
FIG. 2 is a detailed block diagram of the static library shown in FIG. 1

As shown in FIG. 2, the static library 30 includes two interfaces, an application interface 40 for interfacing the static library with the application and a DLL interface 42 for interfacing the static library with the locally resident DLL 32. The static library also includes a loader 44 and an Internet access module 46. The application interface 40 is coupled to the loader 44, the Internet access module 46 and the DLL interface 42. The static libray 30 uses the loader 44 to load the DLL 32 into the memory 20 (FIG. 1) at run time. The Internet access module 46 enables Internet access, thus allowing the static library to download the updated DLL 32' stored in the Web server 14 into the disk 24 so that updated DLL 32' may serve as DLL 32 or replace the existing DLL 32 (as indicated by the arrows 48).

The static library 30 locates and connects to the dynamic library 32. Additionally, the static library 30 can locate and connect to a replacement for a missing DLL, or an incompatible DLL. The static library 30 passes application (or more specifically, API) calls through to a found DLL once the static library has located and attached to the DLL. The DLL, in contrast, actually implements all of the API calls of the application. Additionally, the DLL may be directed to update itself in response to a user command or at periodic intervals established by a user-defined setting, as will be described later with reference to FIG. 7.

Embodiments can be designed to operate in an object-oriented environment and provide explicit support for object oriented languages, such as C++. This support includes linking by class where the dynamic library exports a class and the application program imports a class. The application has access to all of the public virtual and non-virtual member functions of such dynamically linked classes. However, one skilled in the art will also recognize that the present invention can be practiced in a non-object-oriented environment designed to support procedural programming languages, e.g., standard C, as well.

Figure 3:
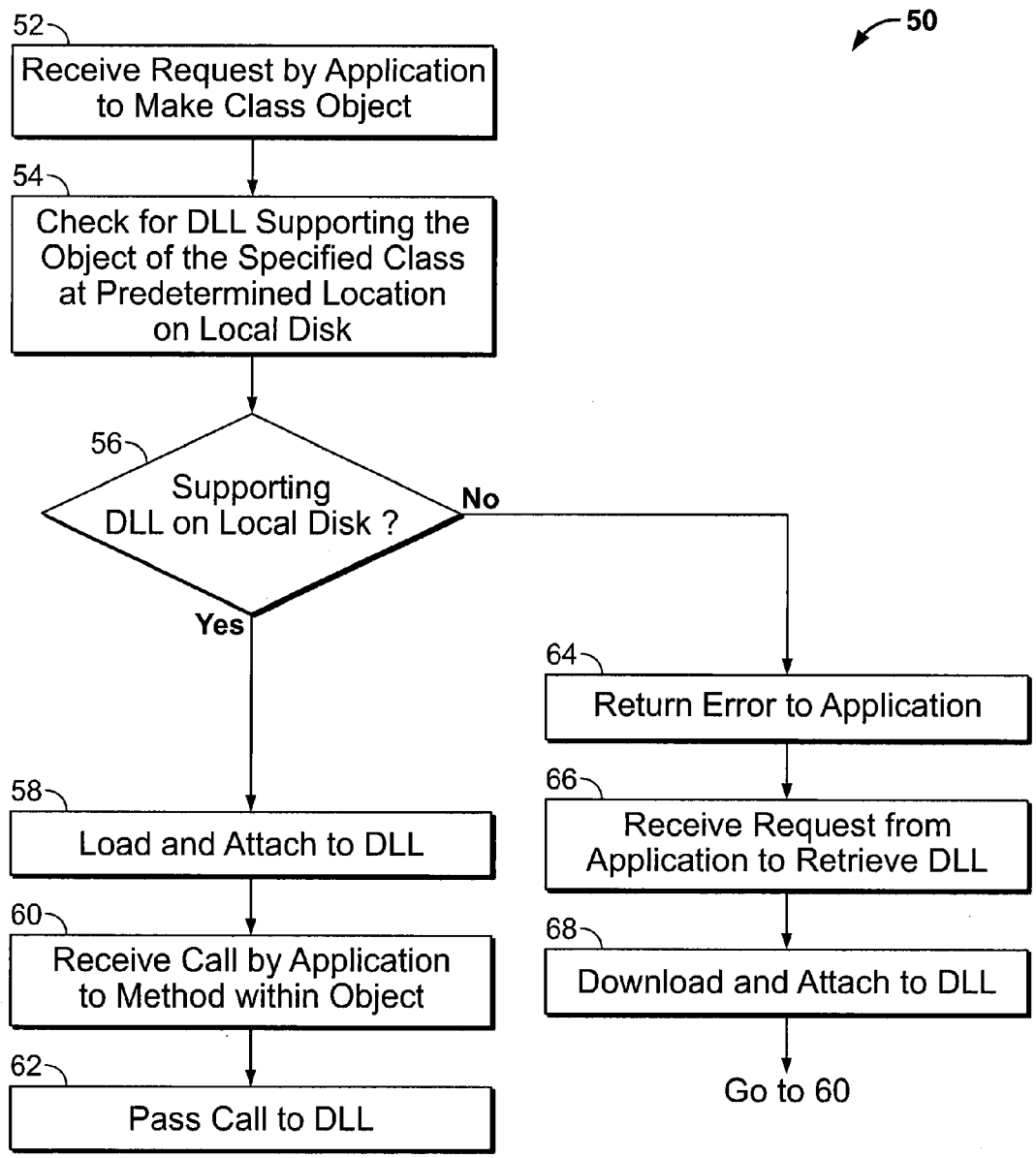
FIG. 3 is a flow diagram of a dynamic library linking process performed by the static library of FIG. 1.

The operation of the static library 30 will now be discussed with reference to FIG. 3, which illustrates a dynamic linking process 50 performed by the static library 30. Referring to FIG. 3, the application interface 40 of the static library 30 receives 52 a request by the application 28 to connect to a particular dynamic library. In an object-orient implementation, the application requests 52 that an object of a class specified as an AWE class be instantiated. In response to this request, the application interface 40 searches 54 the local disk for a DLL supporting this class object. Specifically, the application interface 40 checks the disk of the user's system (i.e., computer system 12) in a predefined, shared location and looks in that shared location for a DLL file with a pre-defined name (e.g., AdobeWeb.dll). If the DLL is found, the application interface determines if it is the correct version.

If the static library has located a supporting DLL on the user's machine 56, the static library loads and attaches 58 to the DLL. The loading operation is performed by the loader 44. The application interface 40 attaches to the dynamic library by obtaining an entry point (into the DLL) which, when called by the static library via the DLL interface 42, returns a pointer to the object for use in accessing methods within the instantiated object. The application can then use the AWE object it created to invoke other methods within the static library. Once the application interface receives 60 a call by the application to a method within the AWE class object, it signals to the DLL interface 42 to pass 62 the call along to the DLL.

If the DLL is missing or determined to be the incorrect version (i.e., no supporting DLL is found) 56, the application interface returns 64 an error code to the calling application. At this point, the calling application may ask the user if the updated DLL should be downloaded. If the static library receives 66 a call (by the application) to download the updated DLL 32', the static library downloads and attaches itself 68 to the updated DLL. Specifically, the static library retrieves the updated DLL by opening an HTTP connection to a predefined URL (at which the updated DLL is stored) via the Internet access module 46, downloads the updated DLL from the Web server 14 and places the updated DLL in the shared folder. It attaches to the updated DLL (using the same process as earlier described). The application interface 40 then transfers calls directed to a method within the object on to the DLL interface 42, which passes the calls on to the updated DLL 32'(now DLL 32, once stored on the user's machine).

If the application does not request that the updated DLL be retrieved (i.e., the user's answer is 'no'), the application may choose to close its connection to the static library using another API call or continue to make calls through the current AWE object it has. Future calls through this object will continue to return that the DLL is missing until the application requests that the updated DLL be retrieved.

To terminate the connection to the DLL, the static library obtains and calls another entry point (causing the DLL to deallocate memory resources used during the execution of the DLL code) and unloads the DLL.

Thus, the networked system 10 is provided with two libraries which work together to hide the repairing mechanism from the calling application and allow the replacement of the DLLs to occur without the application's knowledge. The first library is the static library 30, which contains all of the API calls for the application to which it is linked. The second library is the dynamic library, which can be retrieved from the Web when the copy on the user's machine is either missing or incompatible with the application. Because the application only interacts with the static library, it does not know how the connection to the DLL is made or how the DLL is replaced. It simply calls the static libary's defined API, which mirrors that of the DLL.

The operation of the static library is most advantageous when the DLL is shared across multiple applications, as is typically the case, because the operation works in such a manner so as to maintain backward compatibility. While applications developers design and develop new features and new API calls, it is generally necessary to support existing (older) applications. It is also important that newer applications (those which make newer API calls) function properly when confronted with an older version of the dynamic library, as might occur, for example, if an older application is reinstalled from original disks and an older DLL is put in place of the newer one. Using the dynamic library linking process as described above, the static library will determine that the installed DLL does not support the newer API calls used by the newer application and retrieve from the Web the most up-to-date version.

FIG. 4 illustrates an exemplary definition of the application interface 40 (from FIG. 2), shown as a "Stage 1 Class Interface" 80 for class AWE. Code 82 serves to initialize the class parameters. Code 84 is a pointer to the actual class implementation instance. Code 86 initializes the AWE component specifically for the application. Code 87 is a class instance destructor for class AWE. It is used to free local resources when the DLL is no longer in use. Code 88 specifies the so-called "stage 1" calls required by the application. For example, the application makes a "LoadComponent" call 89 to download the latest DLL version in response to an error code returned by the static library.

The constructor of the AWE class is called by the application by the code "gAWE_object=new AWE(&a, &b, &c);". It is the constructor's responsibility to find the dynamic library on the user's machine and attach to it if it is found.

Referring to FIG. 5, the corresponding DLL class definition 90 is shown. It can be seen that a AWE_1_impl class 92 is an implementation of the AWE$_{-1}$ class that is identical in form to the one used by the static library 30.

As indicated above, the DLL may be improved upon without impacting the ability of a calling application to run properly. A new "Stage 2" DLL which implements new features is accompanied by a new "Stage 2" static library, one that exposes a new AWE class having new calls listed under "Stage 2 calls" 100, as shown in FIG. 6. This new interface provides new features to any application that links to the static library. Consequently, a new AWE_2 abstract class and an implementation of that class AEW_2_impl for use within the new dynamic library that supports these calls must also be constructed.

Because of the class inheritance displayed in the API definitions illustrated in FIGS. 4-6, all applications only supported by the stage 1 interface methods (such as products which shipped before stage 2 was developed), can still make stage 1 calls even using a newer dynamic library. This ensures that newer version of the dynamic library can be placed on the Web site for downloading and that every version of the products using the DLL update will function correctly.

Also solved is the problem that arises when a newer application (i.e., one that supports stage 2 calls) tries to use a stage 1 dynamic library. The static library determines that the dynamic library does not support the stage 2 calls and returns to the application an error code indicating that a newer version of the DLL is needed. When the application calls LoadComponent to obtain the newer version, the newer version is downloaded from the Web and attached to static library so the newer application can proceed.

Specifically, compatibility is achieved by having only two exposed entry points in each dynamic library for each stage of the API that the dynamic library supports. For example, the stage 1 dynamic library has the follwing two exposed entry points:

```
extern "C" DllExport AEW_1 * CreateAwe_1_Instance( );
extern "C" DllExport void DestroyAwe_1_Instance(AWE_1 *inClass);
```

The first entry point allows the static library to create a new AWE_1_impl class object and obtain a pointer to it. The second call allows the static library to destroy the passed in AWE_1_impl class object when it is no longer needed.

A dynamic library supporting stage 2 API calls would have four exposed entry points, one for each API level:

```
extern "C" DllExport AWE_1 * CreateAwe_1_Instance( );
extern "C" DllExport void DestroyAwe_1_Instance(AWE_1 *inClass);
extern "C" DllExport AWE_2 * CreateAwe_2_Instance( );
extern "C" DllExport void DestroyAwe_2_Instance(AWE_2 *inClass);
```

When a stage 1 supporting application wants to connect to the dynamic library, the static library looks for the CreateAwe_1_Instance function within the DLL, and then calls it to create a new AWE_1_impl class object. In response, the DLL returns the object pointer to the static library. Similarly, when a stage 2 supporting application wants to connect to the dynamic library, the static library looks for the CreateAwe_2_Instance function within the DLL. Since both levels are exposed, both stage 1 and stage 2 supporting applications can use the dynamic library at the same time.

If a stage 2 application tries to connect to the dynamic library and the static library cannot find the an exposed CreateAwe_2_Instance function, the static library recognizes that the dynamic library that is installed cannot support the stage 2 API calls and returns an error to the application. This, in turn, causes the application to call the LoadComponent function to find a new copy that does support the stage 2 calls.

As earlier mentioned, a locally resident DLL 32 (from FIG. 1) has the capability to check for updates to itself. Unlike the static library 30, which searches for a DLL update at a predefined location (e.g., specified URL), the DLL has the ability to perform a more comprehensive search for the updated file. Instead of going directly to a particular Web site, the DLL accesses a listing of all Web locations at which the DLL update has been stored. The listing is provided by the application developer in the form of an XML document. The DLL can check the XML document file for references to the updated DLL and can obtain the URL corresponding to a Web server nearest the user's own system. Thus, the XML file balances server loads and reduce traffic issues by providing a mechanism according to which updated DLL files may be distributed closer to the end user.

Figure 7:
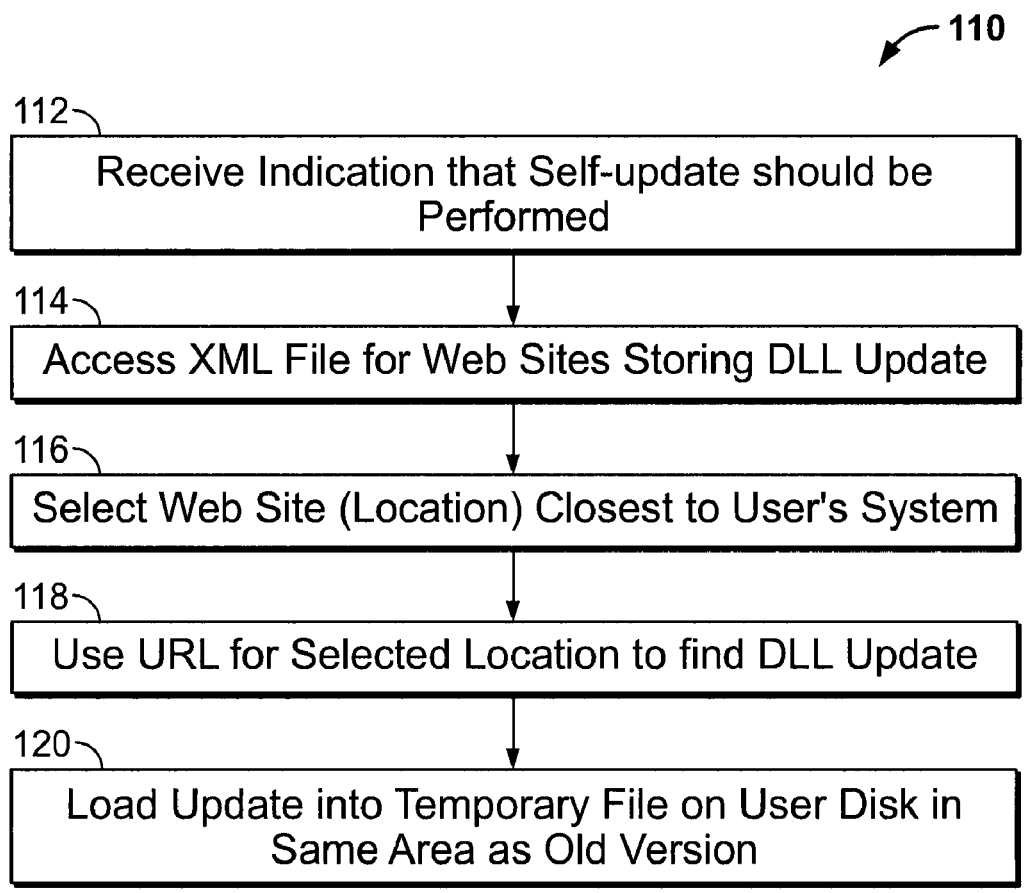
FIG. 7 is a flow diagram of a dynamic library self-updating process.

Referring to FIG. 7, the DLL self-updating process 110 is shown. First, the DLL receives 112 an indication that a self-update should be performed. This indication is generated by the user either in the form of a user command or in accordance with a predefined system setting. The DLL accesses 114 an XML file from a predefined Web server location for references to the DLL update in order to obtain locations at which the update is stored. It selects 116 a location closest to the user's system and uses 118 the URL for the selected location to find the DLL update. It downloads the update from the Web site corresponding to the selected URL, storing the downloaded update on the user's hard disk in a temporary file in the same disk area as the old version. As the old version cannot be replaced while it is running, the static library is given the responsibility for performing this task. Thus, in embodiments that employ the DLL self-update process 110, when the static library determines if the DLL is resident on the user's hard disk, it checks the shared location on disk to see if the update exists in a temporary file. If it does, the static library replaces the old version with the update in the temporary file. Therefore, in certain instances, the DLL self-updating process saves the static library from having to retrieve the DLL update.

FIG. 8 illustrates a portion of an exemplary XML document file 130 containing references to the "class AWE/stage 2 functions" DLL update files. As shown, the file specifies HREF attributes 132 that contain a URL, thus indicating the target of the hyperlink. Additionally, the file provides the document type definition for "AWE" 134, the application names 136, supported platforms 138 and version information 140.

Although the DLL self-update process has been described with particular reference to XML, it will be appreciated by those skilled in the art that a document file implementing an alternative markup language having hyperlinking facilities, e.g., HTML, could also be used.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for using a static library to dynamically load a dynamically linked library comprising:
  receiving a request from an application program to connect to a dynamically linked library;
  while the application program is running:
    checking a computer system running the application program for the dynamically linked library;
    determining if the dynamically linked library needs to be loaded;
    loading the dynamically linked library from a predetermined location onto the computer system if the dynamically linked library needs to be loaded, such that the application program continues to function properly; and
    attaching the dynamically linked library to a static library, the static library capable of passing one or more application calls from the application program to the dynamically linked library.

2. The method of claim 1, wherein the determining if the dynamically linked library needs to be loaded further comprises:
  determining if the dynamically linked library is the correct version.

3. The method of claim 1, wherein the determining if the dynamically linked library needs to be loaded further comprises:
  determining if the dynamically linked library is missing.

4. The method of claim 1, wherein the predetermined location is an external resource, the external resource including a Web server or a CD-ROM.

5. The method of claim 1, wherein the method further comprising:
  downloading a new version of the dynamically linked library from a Web server; and
  storing the new version of the dynamically linked library on the computer system running the application program.

6. The method of claim 1, wherein the static library comprises an application interface, a dynamically linked library interface, a loader, and an Internet access module.

7. The method of claim 6, wherein the application interface receives the one or more application calls from the application program.

8. The method of claim 6, wherein the dynamically linked library interface passes the one or more application calls from the application program to the dynamically linked library.

9. The method of claim 6, wherein the loader loads the dynamically linked library into a memory of the computer system running the application program.

10. The method of claim 6, wherein the Internet access module opens an HTTP connection to a server to download the dynamically linked library.

11. A system to perform operations for using a static library to dynamically load a dynamically linked library comprising:
  one or more computers operable to perform operations comprising:
    receiving a request from an application program to connect to a dynamically linked library;
    while the application program is running:
      checking a computer system running the application program for the dynamically linked library;
      determining if the dynamically linked library needs to be loaded;
      loading the dynamically linked library from a predetermined location onto the computer system if the dynamically linked library needs to be loaded, such that the application program continues to function properly; and
      attaching the dynamically linked library to a static library, the static library capable of passing one or more application calls from the application program to the dynamically linked library.

12. The system of claim 11, wherein the determining if the dynamically linked library needs to be loaded further comprises:
  determining if the dynamically linked library is the correct version.

13. The system of claim 11, wherein the determining if the dynamically linked library needs to be loaded further comprises:
  determining if the dynamically linked library is missing.

14. The system of claim 11, wherein the predetermined location is an external resource, the external resource including a Web server or a CD-ROM.

15. The system of claim 11, wherein the one or more computers are operable to perform operations further comprising:
  downloading a new version of the dynamically linked library from a Web server; and
  storing the new version of the dynamically linked library on the computer system running the application program.

16. The system of claim 11, wherein the static library further comprises an application interface, a dynamically linked library interface, a loader, and an Internet access module.

17. The system of claim 16, wherein the application interface receives the one or more application calls from the application program.

18. The system of claim 16, wherein the dynamically linked library interface passes the one or more application calls from the application program to the dynamically linked library.

19. The system of claim 16, wherein the loader loads the dynamically linked library into a memory of the computer system running the application program.

20. The system of claim 16, wherein the Internet access module opens an HTTP connection to a server to download the dynamically linked library.

21. The system of claim 11, wherein the one or more computers are coupled to a Web server via the Internet.

22. The system of claim 11, wherein the one or more computers comprise a processor, a memory, a nonvolatile memory, and a hard disk.

23. A computer product, encoded on a computer-readable medium, operable to cause a data processing apparatus to perform operations for using a static library to dynamically load a dynamically linked library comprising:
　　receiving a request from an application program to connect to a dynamically linked library;
　　while the application program is running:
　　　　checking a computer system running the application program for the dynamically linked library;
　　　　determining if the dynamically linked library needs to be loaded;
　　　　loading the dynamically linked library from a predetermined location onto the computer system if the dynamically linked library needs to be loaded, such that the application program continues to function properly; and
　　　　attaching the dynamically linked library to a static library, the static library capable of passing one or more application calls from the application program to the dynamically linked library.

24. The computer program product of claim 23, wherein the determining if the dynamically linked library needs to be loaded further comprises:
　　determining if the dynamically linked library is the correct version.

25. The computer program product of claim 23, wherein the determining if the dynamically linked library needs to be loaded further comprises:
　　determining if the dynamically linked library is missing.

26. The computer program product of claim 23, wherein the predetermined location is an external resource, the external resource including a Web server or a CD-ROM.

27. The computer program product of claim 23, wherein the computer program product is operable to cause the data processing apparatus to perform operations further comprising:
　　downloading a new version of the dynamically linked library from a Web server; and
　　storing the new version of the dynamically linked library on the computer system running the application program.

28. The computer program product of claim 23, wherein the static library comprises an application interface, a dynamically linked library interface, a loader, and an Internet access module.

29. The computer program product of claim 28, wherein the application interface receives the one or more application calls from the application program.

30. The computer program product of claim 28, wherein the dynamically linked library interface passes the one or more application calls from the application program to the dynamically linked library.

31. The computer program product of claim 28, wherein the loader loads the dynamically linked library into a memory of the computer system running the application program.

32. The computer program product of claim 28, wherein the Internet access module opens an HTTP connection to a server to download the dynamically linked library.

* * * * *

UNITED STATES PATENT AND TRADEMARK OFFICE
CERTIFICATE OF CORRECTION

PATENT NO. : 7,536,683 B2  Page 1 of 1
APPLICATION NO. : 10/831970
DATED : May 19, 2009
INVENTOR(S) : Daniel R. Zimmerman, Andrei Yusov and Murugappan Palaniappan It is certified that error appears in the above-identified patent and that said Letters Patent is hereby corrected as shown below:

Title page, Column 1, after item (65), insert --Related U.S. Application Data
[62] Continuation of U.S. serial no. 09/231,713, filed Jan. 15, 1999.--

Column 1, after the title, insert --This application is a continuation (and claims the benefit of priority under 35 USC 120) of U.S. application serial no. 09/231,713, filed January 15, 1999. The disclosure of the prior application is considered part of (and is incorporated by reference in) the disclosure of this application.--

Signed and Sealed this

Eighth Day of December, 2009

David J. Kappos
*Director of the United States Patent and Trademark Office*